US008548878B1

(12) United States Patent
Graham et al.

(10) Patent No.: US 8,548,878 B1
(45) Date of Patent: Oct. 1, 2013

(54) AGGREGATING PRODUCT INFORMATION FOR ELECTRONIC PRODUCT CATALOGS

(75) Inventors: Michael Graham, Pittsburgh, PA (US); Nan Li, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/045,973

(22) Filed: Mar. 11, 2011

(51) Int. Cl.
*G06Q 30/00* (2012.01)
*G06K 9/62* (2006.01)
*G06K 9/64* (2006.01)

(52) U.S. Cl.
USPC ........................ 705/27.2; 705/26.64; 705/27.1

(58) Field of Classification Search
USPC ..................................... 705/26.64, 27.1, 27.2
See application file for complete search history.

(56) References Cited

U.S. PATENT DOCUMENTS

| | | | | |
|---|---|---|---|---|
| 5,937,084 | A * | 8/1999 | Crabtree et al. | 382/137 |
| 7,627,502 | B2 * | 12/2009 | Cheng et al. | 705/27.2 |
| 7,813,561 | B2 * | 10/2010 | Jia et al. | 382/225 |
| 8,051,079 | B2 * | 11/2011 | Cheng et al. | 707/733 |
| 8,180,690 | B2 * | 5/2012 | Mayle et al. | 705/27.1 |
| 8,194,985 | B2 * | 6/2012 | Grigsby et al. | 382/218 |
| 8,233,723 | B2 * | 7/2012 | Sundaresan | 382/218 |
| 8,311,344 | B2 * | 11/2012 | Dunlop et al. | 382/224 |
| 2004/0111438 | A1 * | 6/2004 | Chitrapura et al. | 707/200 |
| 2006/0059135 | A1 | 3/2006 | Palmon et al. | |
| 2008/0037877 | A1 * | 2/2008 | Jia et al. | 382/224 |
| 2008/0109327 | A1 * | 5/2008 | Mayle et al. | 705/27 |
| 2008/0154898 | A1 * | 6/2008 | Cheng et al. | 707/6 |
| 2008/0159622 | A1 * | 7/2008 | Agnihotri et al. | 382/157 |
| 2009/0094260 | A1 * | 4/2009 | Cheng et al. | 707/100 |
| 2009/0148052 | A1 * | 6/2009 | Sundaresan | 382/224 |
| 2009/0171943 | A1 * | 7/2009 | Majumder et al. | 707/5 |
| 2009/0208106 | A1 * | 8/2009 | Dunlop et al. | 382/173 |
| 2009/0240735 | A1 * | 9/2009 | Grandhi et al. | 707/104.1 |
| 2009/0254455 | A1 * | 10/2009 | Rothey et al. | 705/27 |
| 2009/0304267 | A1 * | 12/2009 | Tapley et al. | 382/156 |
| 2009/0319388 | A1 * | 12/2009 | Yuan et al. | 705/26 |
| 2010/0153389 | A1 * | 6/2010 | Angell et al. | 707/736 |
| 2010/0217684 | A1 * | 8/2010 | Melcher et al. | 705/27 |

(Continued)

FOREIGN PATENT DOCUMENTS

EP 133399 A2 * 8/2003

OTHER PUBLICATIONS

Anon., "Vertis Provides On-Site Photography Solution for VF Playwear Inc.; Leading Provider of Creative Images Delivers Digital Impact to VF Playwear," Business Wire, Jun. 17, 2002.*

(Continued)

*Primary Examiner* — Nicholas D Rosen
(74) *Attorney, Agent, or Firm* — Morris & Kamlay LLP

(57) ABSTRACT

A product catalog includes information regarding products for sale online by various merchants. An analysis software module can collect information regarding new product offers and associate that information with existing product information in the catalog. The module can identify one or more potential product matches in the catalog based on identical or similar strong identifier information between the offer and the potential match, and/or based on query search result relationships between the offer and the potential match. The analysis module can evaluate each potential match by performing an image comparison between one or more product images provided with the offer and one or more representative images selected by the analysis module for the potential matching product. If the analysis module confirms a match, the analysis module can add information regarding the new product offer to the product catalog, associating the new product offer with the confirmed matching product.

15 Claims, 4 Drawing Sheets

(56) References Cited

U.S. PATENT DOCUMENTS

| | | | | |
|---|---|---|---|---|
| 2011/0106656 | A1* | 5/2011 | Schieffelin | 705/26.9 |
| 2011/0184972 | A1* | 7/2011 | Ard et al. | 707/769 |
| 2011/0270697 | A1* | 11/2011 | Sunkada | 705/26.1 |
| 2012/0045134 | A1* | 2/2012 | Perronnin et al. | 382/197 |

OTHER PUBLICATIONS

Anon., "MarkMonitor Applies Patent Pending Technologies to More Effectively Combat Counterfeit Activity Online," PR Newswire, Feb. 8, 2006.*
U.S. Appl. No. 12/950,655, filed Nov. 19, 2010.
U.S. Appl. No. 13/230,391, filed Sep. 12, 2011.
U.S. Appl. No. 13/081,033, filed Apr. 6, 2011.
U.S. Appl. No. 13/226,333, filed Sep. 9, 2011.
U.S. Appl. No. 13/565,777, filed Aug. 2, 2012.
U.S. Appl. No. 13/425,068, filed Mar. 20, 2012.
U.S. Appl. No. 13/600,194, filed Aug. 30, 2012.
Liu et al., "Clustering Billions of Images with Large Scale Nearest Neighbor Search," IEEE Workshop on Applications of Computer Vision, 2007.
Internet Article: eBay: Turbo Lister FAQ—Seller Tools retrieved from http://pages.ebay.com/turbolister, http://pages.ebay.com/turbolister2/faq.html, pp. 1-4, Nov. 30, 2010.
Internet Article: eBay: Turbo Lister—Seller Tools—List Multiple Items and Upload to eBay in Bulk!, http://pages.ebay.com/turbo_lister, pp. 1-2, Nov. 30, 2010.
eBay—Turbo Lister Listing Activity Quick Start Guide, eBay File Exchange Catalog Listing Template Instructions, Ver. 1.1, pp. 1-8, Apr. 1, 2007.
Liu et al., Clustering Billions of Images with Large Scale Nearest Neighbor Search, IEEE Workshop on Applications of Computer Vision (WACV'07), pp. 1-6, Jan. 1, 2007.

* cited by examiner

AGGREGATING PRODUCT INFORMATION FOR ELECTRONIC PRODUCT CATALOGS

TECHNICAL FIELD

The present disclosure relates generally to electronic product catalogs and, more specifically, to aggregating product information for electronic product catalogs using near-duplicate image analysis and query search history.

BACKGROUND

Computer networks, such as the Internet, enable transmission and reception of a vast array of information. In recent years, for example, some commercial retail stores have attempted to make product information available to customers over the Internet. It is becoming increasingly popular for information providers to provide mechanisms by which consumers can compare such product information across multiple manufacturers and retailers. For simplicity, manufacturers, retailers, and others that sell products to customers are interchangeably referred to herein as "merchants." For example, Internet search/shopping sites allow customers to compare pricing information for products across multiple merchants.

Typically, such comparisons are based on information provided in data feeds from the merchants to the information providers. This data should be of good quality to be useful. In particular, product identifiers should be correct so that products can be correctly identified across merchants. For example, the product identifiers can include global trade item numbers ("GTINs"), such as international standard book numbers ("ISBNs"), universal product codes ("UPC codes"), and European article numbers ("EANs"), brand name and model number combinations, and other standardized identifiers. These identifiers are commonly referred to as "strong identifiers." Generally, strong identifiers uniquely identify their corresponding products.

Often, merchant data includes missing or erroneous strong identifiers. For example, some merchants provide random numbers or stock keeping units ("SKUs") in place of correct UPC codes and EANs. Therefore, it is desirable to provide an alternative mechanism for aggregating product information, which does not rely exclusively on strong identifier information provided by merchants.

SUMMARY

In certain exemplary embodiments, information for an electronic product catalog is aggregated. Information regarding a product offer is received. The received information includes information identifying a product subject to the product offer and at least one image of the product subject to the product offer. Based on the received information, a product in an electronic product catalog that potentially matches the product subject to the product offer is identified. An analysis software module determines whether the identified product in the electronic product catalog actually corresponds to the product subject to the product offer by completing a near-duplicate image analysis on the received image and at least one representative image for the product in the electronic product catalog. In certain exemplary embodiments, the analysis software module may determine that the identified product actually corresponds to the product subject to the product offer if the near duplicate image analysis, either alone or in conjunction with analysis of other information, such as a comparison between the respective brand names and/or product identifiers for the identified product and product subject to the product offer, indicates that the identified product corresponds to the product subject to the product offer. The analysis module adds information regarding the product offer to the electronic product catalog, in response to determining that the identified product in the electronic product catalog actually corresponds to the product subject to the product offer. The added information is associated with the identified product in the electronic product catalog. The analysis module is implemented in at least one computer system that comprises instructions stored in a machine-readable medium and a processor that executes the instructions.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
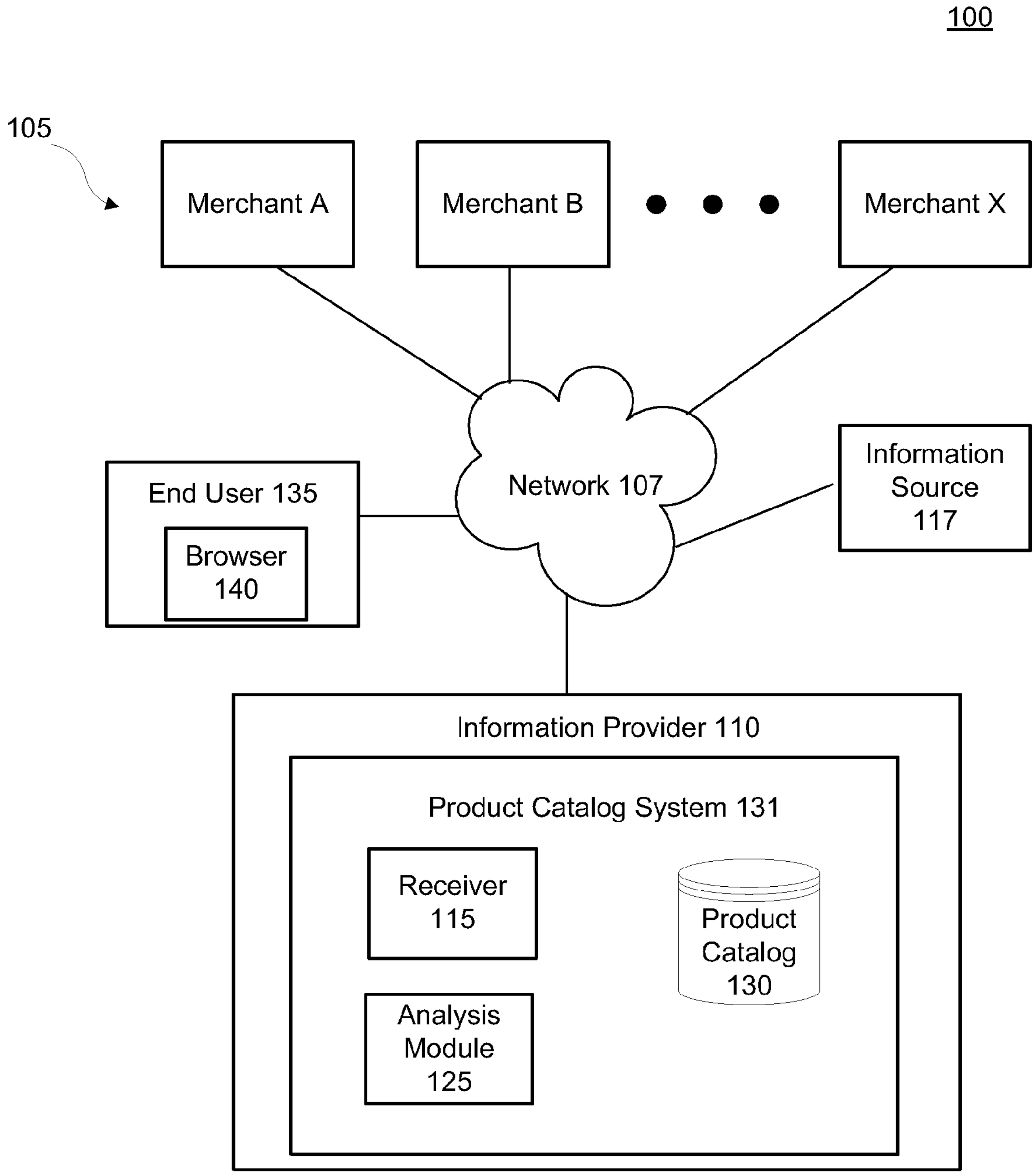
FIG. 1 depicts a system for aggregating product information for electronic product catalogs, in accordance with certain exemplary embodiments.

The method and system described herein enable aggregation of product information for electronic product catalogs. The system includes a product catalog system, which is implemented in hardware and/or software. The product catalog system receives information regarding products offered from multiple merchants. Generally, this information includes, for each product, at least one strong identifier, such as a global trade item number ("GTIN"), universal product code ("UPC"), manufacturer's part number ("MPN"), international standard book number ("ISBN"), European article number ("EAN"), and/or brand name and model number combination. The information also includes at least one image for each product.

An analysis module of the product catalog system can review the product images to identify at least one representative image for each product. When the product catalog system receives information regarding a new product offer, an analysis module of the product catalog system can determine whether the product offer corresponds to a product in the catalog. For example, the analysis module can identify one or more potential product matches in the catalog based on identical or similar strong identifier information between the offer and the potential match, and/or based on query search result relationships between the offer and the potential match. The analysis module can evaluate each potential match by performing an image comparison between one or more product images provided with the offer and the representative image (s) selected by the analysis module for the potential matching product. If the analysis module confirms a match, the analysis module can add information regarding the new product offer to the product catalog, associating the new product offer with the confirmed matching product.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. The inventive functionality of the invention will be explained in more detail in the following description, read in conjunction with the figures illustrating the program flow.

Turning now to the drawings, in which like numerals indicate like elements throughout the figures, exemplary embodiments of the invention are described in detail.

System Architecture

FIG. 1 depicts a system 100 for aggregating product information for electronic product catalogs, in accordance with certain exemplary embodiments. As depicted in FIG. 1, the system 100 includes network devices 105, 110, 117, and 135 that are configured to communicate with one another via one or more networks 107. Each network 107 includes a wired or wireless telecommunication means by which network devices (including devices 105, 110, 117, and 135) can exchange data. For example, each network 107 can include a local area network ("LAN"), a wide area network ("WAN"), an intranet, an Internet, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 117, 135 includes a device capable of transmitting and receiving data over the network 107. For example, each network device 105, 110, 117, 135 can include a server, desktop computer, laptop computer, smartphone, handheld computer, personal digital assistant (PDA), or any other wired or wireless, processor-driven device. In the exemplary embodiment depicted in FIG. 1, the network devices 105, 110, 117, and 135 are operated by merchants, an information provider, an information source, and end user customers, respectively.

The end user network devices 135 each include a browser application module 140, such as Microsoft Internet Explorer, Firefox, Netscape, Google Chrome, or another suitable application for interacting with web page files maintained by the information provider network device 110 and/or other network devices. The web page files can include text, graphic, images, sound, video, and other multimedia or data files that can be transmitted via the network 107. For example, the web page files 107 can include one or more files in the HyperText Markup Language (HTML). The browser application module 140 can receive web page files from the information provider network device 110 and can display the web pages to an end user operating the end user network device 135. In certain exemplary embodiments, the web pages include information from a product catalog 130 of a product catalog system 131, which is maintained by the information provider network device 110. The product catalog system 131 is described in more detail hereinafter with reference to the method illustrated in FIG. 2.

System Process

Figure 2:
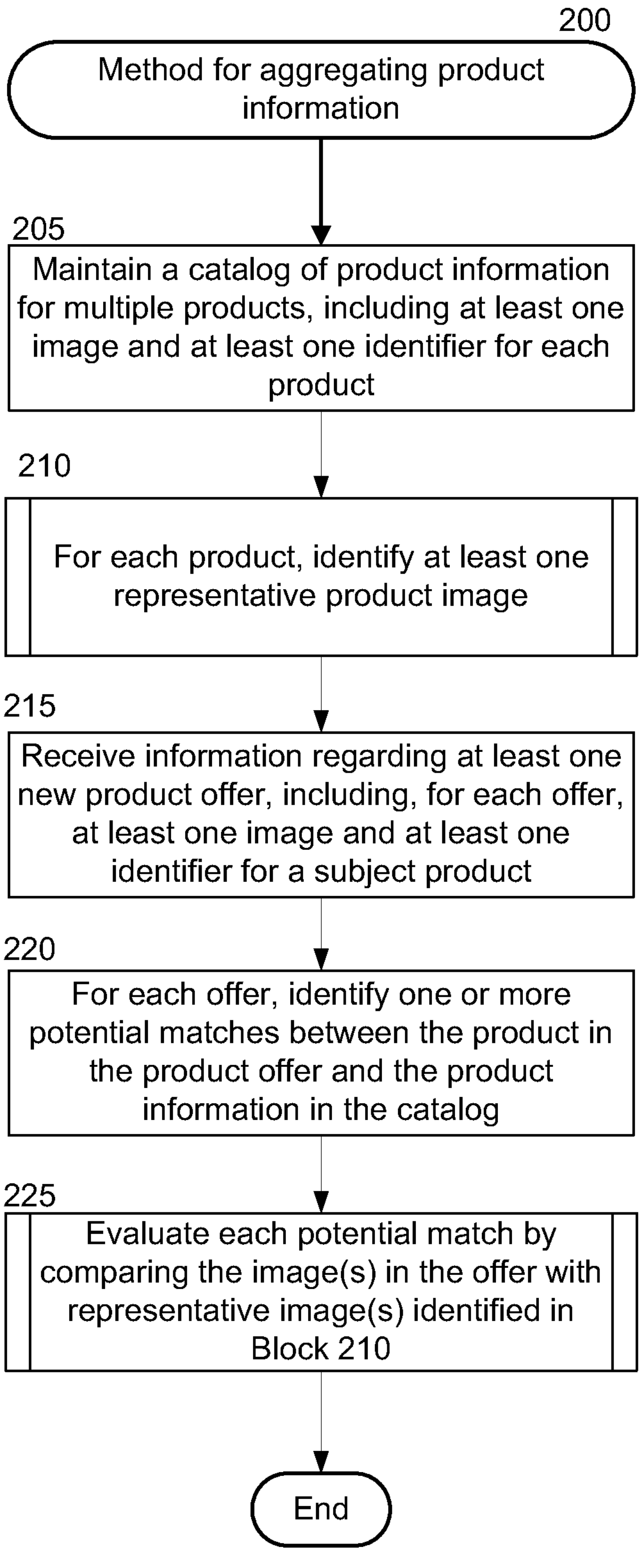
FIG. 2 is a block flow diagram depicting a method for aggregating product information for electronic product catalogs, in accordance with certain exemplary embodiments.

FIG. 2 is a block flow diagram depicting a method 200 for aggregating product information for electronic product catalogs, in accordance with certain exemplary embodiments. The method 200 is described with reference to the components illustrated in FIG. 1.

In block 205, the product catalog system 131 maintains the product catalog 130. The product catalog 130 includes a data structure, such as one or more databases and/or electronic records, that includes information regarding products from at least one merchant 105. For each product, the information in the catalog 130 includes at least one image. The information also may include at least one identifier for the product, such as a GTIN, ISBN, UPC code, EAN, brand name and model number combination, and/or another standardized or non-standardized identifier. Such identifiers are commonly referred to as "strong identifiers."

Generally, strong identifiers uniquely identify their corresponding products. It is often the case, however, that strong identifiers appearing in merchant-provided free-form descriptions associated with product offers can be misleading in determining the identity of the product. For example, a merchant may indicate that a particular accessory is "compatible with" a product indicated by a strong identifier. In this case, the presence of the strong identifier along may not be trusted in determining the identity of the product, absent confirmation via other means, such as the image similarity confirmation described below.

In certain exemplary embodiments, a receiver module 115 of the product catalog system 131 receives information that is included in the product catalog 130 in electronic data feeds and/or hard copy provided by one or more merchants 105 and/or another information source 117, such as a specialized information aggregator. For example, each merchant 105 and/or information source 117 may periodically provide batched or unbatched product data in an electronic feed to the receiver module 115. The receiver module 115 also may receive product information for inclusion in the product catalog 130 from scanned paper product documentation and/or catalogs. In certain exemplary embodiments, the receiver module 115 also may receive the product data from a screen scraping mechanism, which is included in or associated with the product catalog system 131. For example, the screen scraping mechanism may capture product information from merchant and/or information provider websites. In certain exemplary embodiments, end users may view information from the product catalog 130 via browsers 140 on their respective end user network devices 135.

In block 210, an analysis module 125 of the product catalog system 131 identifies at least one representative product image for each product in the product catalog 130. In one example, the product catalog 130 may include information regarding a "Eureka 439AZ" vacuum, including a name, description, rating, and strong identifier for the vacuum, as well as pricing information and images of the vacuum. The images may include photographs or drawings of the vacuum from different angles or zoom levels, for example. The images also may include erroneous "placeholder" images provided in incomplete data feeds. The product catalog system 131 performs a near-duplicate image analysis to cluster similar images together and remove erroneous outlier images. The product catalog system 131 selects one or more of the clustered images as the representative product image for the vacuum. For example, the product catalog system 131 can select one representative image per non-trivial cluster. Block 210 is described in more detail hereinafter, with reference to FIG. 3.

In block 215, the receiver module 115 receives information regarding at least one new product offer. In the embodiment depicted in FIG. 1, the receiver module 115 receives the product offer information via the network 107. For example, each merchant 105 and/or information source 117 may periodically provide batched or unbatched product offer information in an electronic feed to the receiver module 115. The receiver module 115 also may receive product offer information from scanned product documentation and/or catalogs. In certain exemplary embodiments, the receiver module 115 also may receive the product offer information from a screen scraping mechanism, which is included in or associated with the product catalog system 131. For example, the screen scraping mechanism may capture product information from merchant and/or information provider websites.

The product offer information includes, for each offer, at least one image and at least one identifier for a subject product. For example, each identifier may include at least one GTIN, ISBN, UPC code, EAN, brand name and model number combination, and/or another standardized or non-standardized identifier. Each image may include a photograph, drawing, or other depiction of the applicable product (or a portion thereof). In certain exemplary embodiments, one or more of the images may include an erroneous "placeholder" image, which can be provided, for example, when an actual product image is unavailable. The product offer information can include a variety of other information related to the product offers, such as one or more descriptions, ratings, and/or prices for the subject product.

In block 220, the analysis module 125 identifies, for each new product offer, one or more potential matches between the product in the product offer and the product information in the product catalog 130. Thus, the analysis module 125 attempts to correlate each new product offer with a product for which information already is present in the product catalog 130. In certain exemplary embodiments, candidate matches may be identified based on strong identifier matches in the product offer and the product catalog and/or query search result relationships between the offer and the potential match. For example, the analysis module 125 may identify one or more products as potential matches to the product offer if each identified product has an identical or substantially similar strong identifier as a strong identifier included in the product offer.

A query search relationship may indicate a potential match relationship, for example, when an end user 135 performs a search for a particular product via an Internet-based search engine and both the product offer and a portion of the product catalog 130, which includes the potentially matching product, are displayed in the search results to the end user 135. A mechanism for exploiting such query search relationships may involve consulting a mapping between query search strings and the set of product offers and the portions of the product catalog 130 that have been shown to and/or clicked by end users 135 in response to the queries. A potential match between a product offer and a portion of the catalog 130 may be indicated when the product offer is frequently viewed and clicked by end users 135 for identical query search strings. It also may be useful to filter out some potential match relationships that have a higher probability of being erroneous. For example, if two or more product offers for different products have similar images and are frequently viewed and clicked by end users 135 for identical query strings, then these offers are likely to be confused by the analysis module 125. It may be beneficial to ignore such product offers when proposing potential match relationships.

In block 225, the analysis module 125 evaluates each potential match by comparing each image in the product offer with each representative image identified in block 210. If the analysis module 125 confirms a match between a product offer image and a representative product image, the analysis module 125 can add information regarding the product offer to the product catalog 130. The added information can be linked or otherwise associated with the existing information in the catalog 130 related to the matching image, for example.

If the analysis module 125 does not confirm a match with a product offer image, the analysis module 125 can perform additional, non-image based analysis to determine whether the product offer corresponds to a product for which information already exists in the product catalog 130. In addition or in the alternative, the analysis module 125 may suspend or terminate processing of the product offer in response to determining that the product offer does not correspond to a known product. Such action may involve alerting the merchant 105 associated with the product offer that the product offer does not match any known products. In certain exemplary embodiments, the merchant 105, an information source 117, and/or an operator of the information provider 110 or product catalog system 131 may override the decision not to include the information regarding the unmatched product offer in the catalog 130. For example, in certain circumstances, failure of a product offer to match an existing product in the catalog 130 may indicate that the product offer relates to a new product for which information has not yet been included in the catalog 130. The analysis module 125 may add the information regarding the new product to the catalog 130 in certain exemplary embodiments. Block 225 is described in more detail hereinafter, with reference to FIG. 4.

Figure 3:
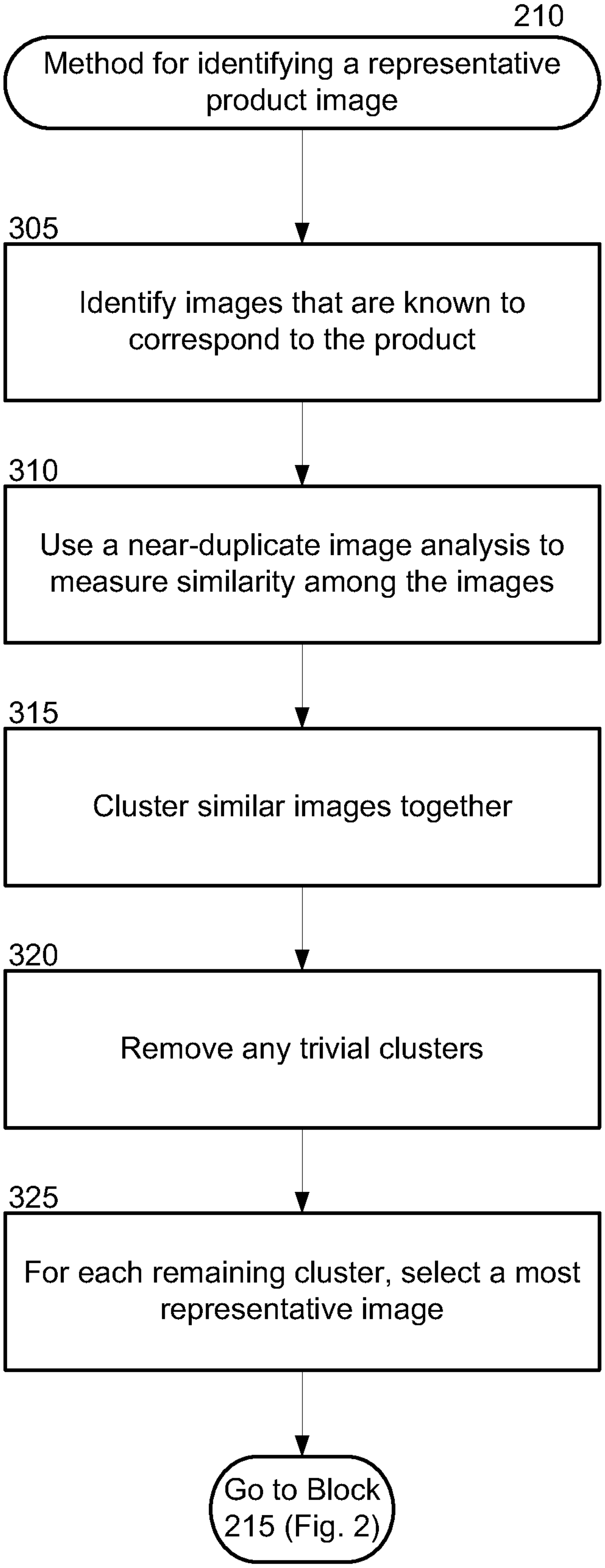
FIG. 3 is a block flow diagram depicting a method for identifying a representative product image, in accordance with certain exemplary embodiments.

FIG. 3 is a block flow diagram depicting a method 210 for identifying a representative product image, in accordance with certain exemplary embodiments, as referenced in block 210 of the method 200 of FIG. 2. In block 305, the analysis module 125 identifies images that are known to correspond to the product. For example, the analysis module 125 may identify one or more images stored in, linked from, or identified in the product catalog 130, in connection with the product. Each image includes a photograph, drawing, or other depiction of at least a portion of the product. The images also may include one or more erroneous images, such as "placeholder" images provided in an incomplete or error-laden data transfer.

In block 310, the analysis module 125 measures similarity among the images using a "near-duplicate" image analysis. In certain exemplary embodiments, such analysis includes detecting and describing features in the images and computing the number of shared features across one or more pairs of the images. For example, image features may be identified using the scale-invariant feature transform (SIFT), Harris corner detection, shape context evaluation, spin images analysis, wavelet-based analysis, and/or other methods or systems for feature detection/description.

In block 315, the analysis module 125 clusters similar images together. For example, the analysis module 125 can cluster images together when the images share at least a threshold number of the same features. In certain exemplary embodiments, this clustering may involve creating a metric tree or "Spill Tree" data structure from all the feature points in the images. The clustering also may involve calculating a similarity score between pairs of the images. For example, a similarity score may be calculated as the number of matching points divided by the total number of points of interest in the images. The analysis module 125 can query each point in the data structure to find a collection of close matches. For example, the analysis module 125 can consider two image features as close matches when their Euclidean distance is less than a threshold, which may be defined loosely to allow for illumination changes and variations in image quality. In certain exemplary embodiments, the analysis module 125 may verify each cluster using a Hough Transform or other technique.

In block 320, the analysis module 125 removes any trivial clusters from the clustered images. A trivial cluster is a group of images that includes less than a threshold number of images. For example, a cluster can be considered a trivial cluster if it includes three or less images. Trivial clusters generally include unpopular or outlier images, which are not representative of their subject product. By removing trivial clusters in block 320, the analysis module 125 ensures that the images in the trivial clusters are not identified as being representative of the product.

In block 325, the analysis module 125 selects a most representative image for each remaining cluster as the representative image for the product being evaluated. In certain exemplary embodiments, the representative image selected by the analysis module 125 for a particular cluster is the image within the cluster that is most heavily connected to—for example, has the highest similarity scores in relation to—the other images in the cluster. In certain alternative exemplary embodiments, the representative image may be selected without regard to relative similarity between the images in the cluster. For example, the analysis module 125 may select the first, last, or a random image in a cluster as the representative image for the cluster.

The method 210 continues to block 215 of FIG. 2, discussed previously.

Figure 4:
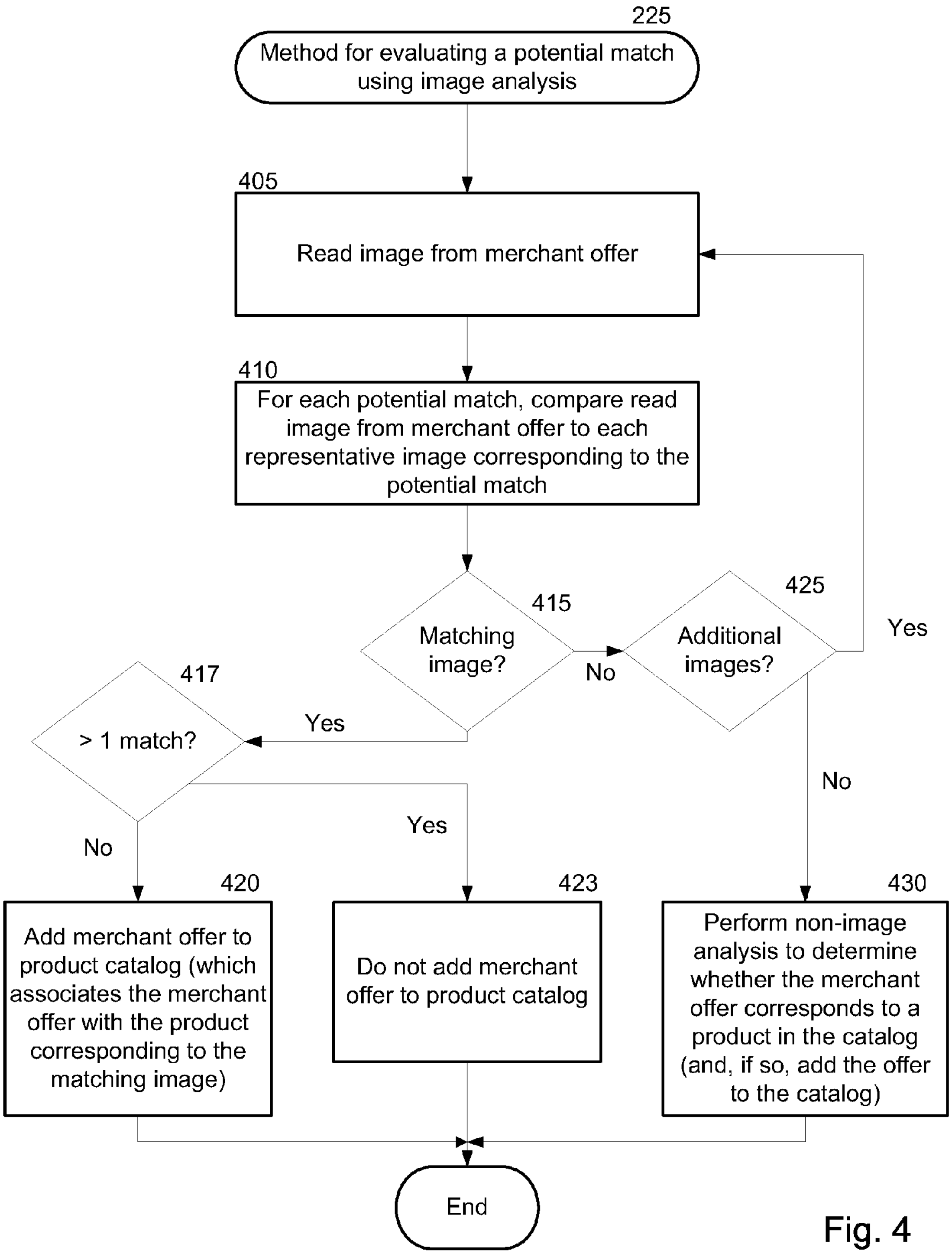
FIG. 4 is a block flow diagram depicting a method for evaluating a potential match using image analysis, in accordance with certain exemplary embodiments.

FIG. 4 is a block flow diagram depicting a method 225 for evaluating a potential match using image analysis, in accordance with certain exemplary embodiments, as referenced in block 225 of the method 200 of FIG. 2. In block 405, the analysis module 125 reads an image from the product offer.

In block 210, for each potential match identified in block 220 of the method 200, the analysis module 125 compares the image read in block 405 with each representative image corresponding to the potential match. In certain exemplary embodiments, the analysis module 125 can measure similarity among the image read in block 405 and each representative image for each potential match using a near-duplicate image analysis, substantially as set forth above in connection with block 210 of FIG. 2. For example, the analysis module 125 can calculate a similarity score for each image pair (which includes the image read in block 405 and one of the representative images).

In block 415, the analysis module 125 determines, for each comparison performed in block 410, whether the images match. For example, the analysis module 125 may determine that the images match if a similarity score assigned to the image pair exceeds a threshold score. If the analysis module 125 determines in block 415 that a match exists, the method 225 continues to block 417. In block 417, the analysis module 125 determines whether more than one product in the product catalog 130 matches the product in the product offer. A match of a product in a product offer to more than one product in the product catalog 130 may be considered an "ambiguous match," indicating that it may be impracticable or undesirable to select a single product in the product catalog 130 to match with the product in the product offer. Therefore, if the analysis module 125 determines in block 417 that the product in the product offer matches more than one product in the product catalog 130, the analysis module 125 may determine not to add information regarding the product offer to the product catalog 130 in block 423.

If the analysis module 125 determines in block 417 that the product in the product offer matches only one product in the product catalog 130, then, in block 420, the analysis module 125 adds information regarding the product offer, such as a price, merchant name, description, and other information, to the product catalog 130. The analysis module 125 also associates the added information with the existing product corresponding to the matching image.

Referring back to block 415, if the analysis module 125 determines that a match does not exist between the image read in block 405 and any representative image against which that image was compared in block 410, the method 225 branches to block 425. In block 425, the analysis module 125 determines whether any additional images in the product offer should be evaluated. If so, the method 225 returns to block 405 to repeat the analysis in blocks 405-415 for another image in the product offer. Thus, if the product offer includes two or more product images, the analysis module 125 may complete the image comparison analysis for each image in the product offer.

If the analysis module determines in block 425 that additional images do not remain to be evaluated, the method 225 branches to block 430. In block 430, the analysis module 125 performs a non-image based analysis to determine whether the product offer corresponds to a product for which information already exists in the product catalog 130. For example, the analysis module 125 can compare non-image product information in the product offer with other information in the product catalog 130. In addition or in the alternative, the analysis module 125 may suspend or terminate processing of the product offer in response to determining that the product offer does not correspond to a known product. Such action may involve alerting the merchant 105 associated with the product offer that the product offer does not match any known products. In certain exemplary embodiments, the merchant 105, an information source 117, and/or an operator of the information provider 110 or product catalog system 131 may override the decision not to include the information regarding the unmatched product offer in the catalog 130. For example, in certain circumstances, failure of a product offer to match an existing product in the catalog 130 may indicate that the product offer relates to a new product for which information has not yet been included in the catalog 130. The analysis module 125 may add the information regarding the new product to the catalog 130 in certain exemplary embodiments.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures. For example, although the embodiments described herein generally relate to products and product catalogs, a person of ordinary skill in the art having the benefit of the present disclosure will recognize that the claimed invention may be used in a variety of different applications, which may or may not involve products or product images. For example, in one exemplary embodiment, an item that includes an image may be categorized by comparing an image in the item with representative images for different categories. A category that potentially corresponds to the item may be identified and then confirmed or rejected by determining whether the item image matches one or more representative images for the potential category. For example, the item may include a video, and each category may be associated with a different video. The categorization process can be used to determine whether the received video (of the item) includes copyrighted material from a video associated with one of the categories by comparing the images in the videos.

What is claimed is:

1. A computer-implemented method for aggregating product information for an electronic product catalog, comprising the steps of:

selecting, for each product in an electronic product catalog comprising information regarding products available for sale online, at least one representative image;

receiving information regarding a product offer, the received information comprising information identifying a product subject to the product offer and at least one image of the product subject to the product offer;

identifying, based on the received information, at least one product in the electronic product catalog that potentially matches the product subject to the product offer;

determining, by an analysis module, whether each identified product in the electronic product catalog actually corresponds to the product subject to the product offer by completing an image analysis on the received image and the at least one representative image for each identified product in the electronic product catalog; and in response to determining that a particular identified product actually corresponds to the product subject to the product offer, adding, by the analysis module, information regarding the product offer to the electronic product catalog, the added information associated with the particular identified product in the electronic product catalog, wherein the analysis module is implemented in at least one computer system that comprises instructions stored in a machine-readable medium and a processor that executes the instructions.

2. The method of claim 1, wherein the step of identifying the at least one product in the electronic product catalog that potentially matches the product subject to the product offer comprises the step of determining that the product offer comprises a strong identifier associated with each of the at least one product in the electronic product catalog.

3. The method of claim 1, wherein the step of identifying the at least one product in the electronic product catalog that potentially matches the product subject to the product offer comprises the step of determining, for respective ones of the at least one product in the electronic product catalog, that information regarding the product offer and information regarding the respective product in the electronic product catalog were both included in a set of search results displayed in response to the same product search query.

4. The method of claim 1, wherein the step of selecting the at least one representative image comprises the steps of:

for each product in the electronic product catalog, identifying images that are known to correspond to the product in the electronic product catalog;

measuring similarity among the identified images;

identifying clusters of similar identified images based on the measured similarity; and selecting, from each identified cluster, the at least one representative image.

5. The method of claim 1, further comprising the step of not adding information regarding the product offer to the electronic product catalog in response to determining that none of the identified products in the electronic product catalog actually correspond to the product subject to the product offer.

6. The method of claim 5, further comprising the step of overriding the step of not adding information regarding the product offer to the electronic product catalog in response to determining that the identified product in the electronic product catalog does not actually correspond to the product subject to the product offer.

7. A computer-implemented method for aggregating product information for an electronic product catalog, comprising the steps of:

receiving information regarding a product offer, the received information comprising information identifying a product subject to the product offer and at least one image of the product subject to the product offer;

identifying, based on the received information, a product in an electronic product catalog that potentially matches the product subject to the product offer, the product in the electronic product catalog having at least one representative image associated therewith;

determining, by an analysis module, whether the identified product in the electronic product catalog actually corresponds to the product subject to the product offer by determining whether the received image matches the at least one representative image for the product in the electronic product catalog; and adding, by the analysis module, information regarding the product offer to the electronic product catalog, the added information associated with the identified product in the electronic product catalog, in response to determining that the identified product in the electronic product catalog actually corresponds to the product subject to the product offer, wherein the analysis module is implemented in at least one computer system that comprises instructions stored in a machine-readable medium and a processor that executes the instructions.

8. The method of claim 7, wherein the step of identifying the product in the electronic product catalog that potentially matches the product subject to the product offer comprises the step of determining that the product offer comprises a strong identifier associated with the product in the electronic product catalog.

9. The method of claim 7, wherein the step of identifying the product in the electronic product catalog that potentially matches the product subject to the product offer comprises the step of determining that information regarding the product offer and information regarding the product in the electronic product catalog were both included in a set of search results displayed in response to the same product search query.

10. The method of claim 7, further comprising the step of selecting from a set of product images the at least one representative image for the identified product in the electronic product catalog.

11. The method of claim 10, wherein the step of selecting the at least one representative image comprises the step of performing an image analysis on at least a portion of the product images in the set of product images to identify similar images.

12. The method of claim 10, wherein the step of selecting the at least one representative image further comprises the steps of:

identifying images that are known to correspond to the identified product in the electronic product catalog;

using image analysis to measure similarity among the identified images;

identifying clusters of similar images based on the image analysis; and selecting, from an identified cluster, the at least one representative image.

13. The method of claim 7, further comprising the step of not adding information regarding the product offer to the electronic product catalog in response to determining that the identified product in the electronic product catalog does not actually correspond to the product subject to the product offer.

14. The method of claim 13, further comprising the step of overriding the step of not adding information regarding the product offer to the electronic product catalog.

15. A computer program product, comprising:

a non-transitory computer-readable medium having computer-readable program code embodied therein for aggregating product information for an electronic product catalog, the computer-readable program code, which, when implemented by one or more processors, causes the one or more processors to carry out the steps of:

using near-duplicate image analysis to select, for each product in an electronic product catalog, at least one representative image;

receiving information regarding a product offer, the received information comprising information identifying a product subject to the product offer and at least one image of the product subject to the product offer;

identifying, based on the received information, at least one product in the electronic product catalog that potentially matches the product subject to the product offer;

determining whether each identified product in the electronic product catalog actually corresponds to the product subject to the product offer by completing an image analysis on the received image and the at least one representative image for each identified product in the electronic product catalog; and in response to determining that a particular identified product actually corresponds to the product subject to the product offer, adding information regarding the product offer to the electronic product catalog, the added information associated with the particular identified product in the electronic product catalog.

* * * * *